United States Patent [19]

Miller

[11] 4,087,670

[45] May 2, 1978

[54] PROCESS FOR SUPPRESSION OF NOISE AND FUMES GENERATED BY PLASMA-ARC CUTTING OPERATION

[75] Inventor: Samuel L. Miller, Honey Brook, Pa.

[73] Assignee: Lukens Steel Corp., Coatesville, Pa.

[21] Appl. No.: 521,406

[22] Filed: Nov. 6, 1974

Related U.S. Application Data

[62] Division of Ser. No. 373,882, Jun. 26, 1973.

[51] Int. Cl.² ............................................. B23K 9/00
[52] U.S. Cl. .................................... 219/121 P; 219/72
[58] Field of Search ............................. 219/121 P, 72

[56] References Cited

U.S. PATENT DOCUMENTS

| | | | |
|---|---|---|---|
| 1,749,765 | 3/1930 | Hendrickson | 219/74 |
| 3,833,787 | 9/1974 | Couch | 219/121 P |

Primary Examiner—J. V. Truhe
Assistant Examiner—Fred E. Bell

[57] ABSTRACT

Noise, fuels and potentially dangerous light emissions generated by a plasma-arc cutting operation are suppressed by carrying out the operation with a solid layer of water surrounding the space between the hot effluent discharge of the torch and the workpiece. To localize the layer of water immediately under the discharge nozzle of the torch, a jacket is provided around the lower end of the torch which continually is receiving and discharging water through a skirt guidance member depending from the jacket thus providing a contained volume of moving water around the space involved which immerses the end of the nozzle. A water layer is also provided under the workpiece which receives water leaking around the skirt member and through the kerf created by the torch under its nozzle. Water from under the workpiece is circulated through a separator to remove unwanted materials introduced by the cutting operation. The skirt member is preferably composed of a pliant material such as asbestos cloth, rubber, or brush bristles. However, more rigid material with a partial bottom may be utilized.

23 Claims, 9 Drawing Figures

PROCESS FOR SUPPRESSION OF NOISE AND FUMES GENERATED BY PLASMA-ARC CUTTING OPERATION

REFERENCE TO RELATED APPLICATIONS

This is a divisional application of application Ser. No. 373,882 filed June 26, 1973.

SUMMARY OF THE INVENTION

The invention relates to an apparatus and process for the suppression of noise, fumes and dangerous light emissions generated in the removal of portions of metal by metal removing procedures which generate such noise, fumes and light emissions. More particularly, the invention relates to novel apparatus and process for such suppression of noise, fumes and dangerous light emissions generated by the plasma-arc process.

Plasma-arc cutting is utilized for the removal of selected portions of metal from the metal workpiece and depending upon the particular requirements, such removal may be accomplished by processes such as cutting, gouging, piercing, scarfing, severing, and the like. In the plasma-arc process, a gas is introduced into the electric-arc to combine with the arc and form a plasma which is then restricted to a confined area to produce an effluent characterized by stability, high inertia, high energy per unit area and very high temperatures. The effluent generated by the plasma-arc may be the plasma-arc itself as in a transferred arc, or an effluent which is disassociated in space from the actual plasma-arc such as in non-transferred arcs. In cutting metal, the plasma-arc effluent is brought to bear on the desired area of the workpiece and rapidly heats and melts the metal in such area thus effecting removal of the metal. Although the development of such a high temperature, high energy intensity process for removal of metal has substantially accelerated the rate of metal removal, the plasma-arc operations are noisy, produce large quantities of fumes and cause an extremely bright light which includes ultra violet emissions which damage the human eye.

Fume suppression has been effected with some success by the introduction of water directly into a fume suppression zone below the cutting zone and this is presently a standard well known procedure.

Various methods have been proposed to reduce the noise level of the plasma-arc cutting process which includes the introduction of water curtains around the cutting effluent. However, no apparatus nor method is known which sufficiently reduces the noise level of the plasma-arc cutting operation to a substantially lower level — under 90 decibels — whereby the sound produced by the operation is not likely to injure the hearing of workers in the area over a period of time. In contrast, the present invention reduces the noise level of the plasma-arc cutting operations dramatically to bring it well within acceptable levels; in addition, the bright light generated by the process which previously should be seen only through very dark glass without the possibility of damaging the eyes is considerably subdued and the generation of smoke or fumes by the operation is, with the instant invention, practically non-existent.

Essentially, the invention comprises the surrounding, and, in a sense, the immersion of the plasma-arc effluent in water by surrounding the normal operating space of the plasma-arc between the workpiece and discharge nozzle thereof with a solid body of water which is guided by means such as an asbestos or rubber skirt, brush or the like so that there is a build-up of water between the nozzle and the kerf. The guidance means tends to prevent the water from leaving the operating space and thus produce a certain level of water in such space whereby the discharge nozzle of the plasma-arc orifice is immersed in water. It is believed that the very substantial drop of noise level which occurs is due to the immersion thus produced, the solid body of water surrounding the operating area of the plasma-arc, the guidance means and the skirt surrounding the lower end of the cutting torch which supports the guidance means. This explanation is, as indicated, theoretical but the very substantial reduction of noise level is, in fact, achieved by utilization of the method and apparatus disclosed herein irrespective of the correctness of the theory as to why this occurs.

BRIEF DESCRIPTION OF THE DRAWINGS

The invention is illustrated in preferred embodiments in the accompanying drawings in which.

DESCRIPTION OF THE PREFERRED EMBODIMENTS

Figure 1:
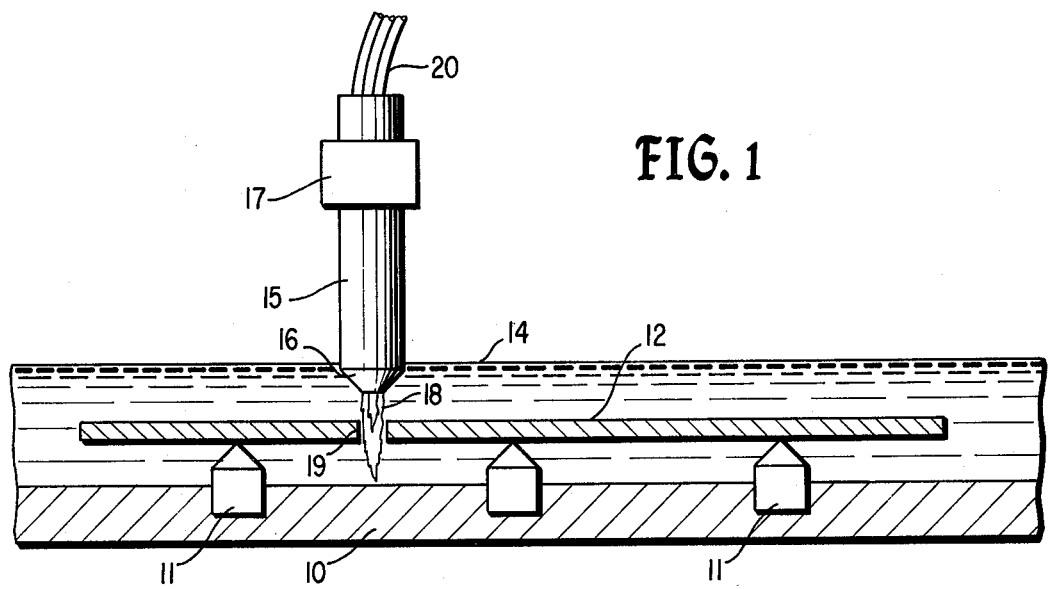
FIG. 1 discloses diagrammatically a plasma-arc cutting torch with the end of the nozzle immersed in a layer of water above a steel plate constituting a workpiece which is also so immersed.

Referring to FIG. 1, a submerged burning table 10 having workpiece supports 11 which support a steel plate workpiece 12 are all submerged under a layer of water 14 which receives a plasma-arc torch 15 in its nozzle portion 16, the torch 15 being carried by a support member 17. Gas and electric conduits designated 20 carry the gas effluents and electrical current for the arc to the torch 15. In operation, the torch 15 with nozzle portion 16 submerged under the layer of water 14 performs a cutting operation on the workpiece 12. This submersion of the steel plate workpiece 12 and the nozzle portion 16 of the plasma-arc cutting torch 15 eliminates smoke and fume and reduces the bright light and noise associated with plasma-arc cutting. The apparatus and method plasma-arc cutting disclosed with reference to FIG. 1 are effective but have the drawback that a considerable amount and weight of water is involved particularly when workpiece 12 is not level as is frequently the case.

Figure 2:
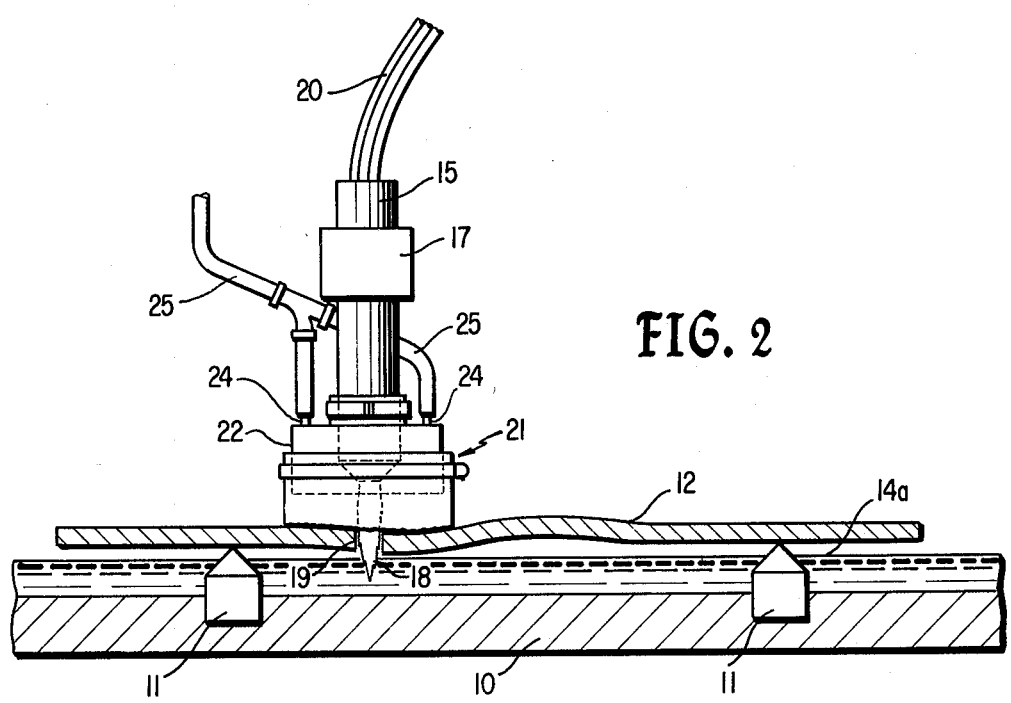
FIG. 2 discloses a preferred embodiment wherein the plasma-arc torch has attached to its lower end an arc container in accordance with the invention.
Figure 3:
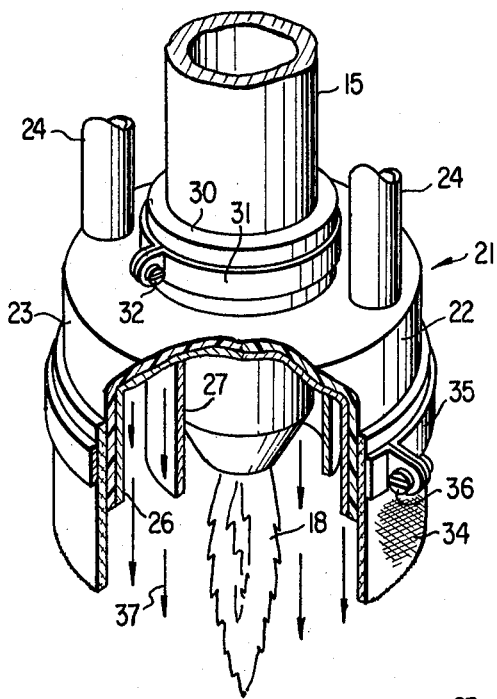
FIG. 3 is a perspective detail showing the arc container, with a portion thereof broken to disclose the interior, secured to the lower end of a plasma-arc torch.

In order to avoid the problems referred to above, wherein the workpiece is immersed in a layer of water 14, it has occurred to the inventor that a skirt might be placed around the nozzle portion 16 and torch 15 whereby, through the introduction of water therein, the nozzle 16 would be, in effect, immersed in water with much the same result as with the apparatus and method discussed with reference to FIG. 1. Thus, referring now to FIGS. 2 and 3, it is to be seen that the burning table 10 with workpiece supports 11 which support workpiece 12, is provided with a layer of water 14a having a lesser depth than the layer of water 14 shown in FIG. 1 so that it is just under workpiece 12 rather than above same. The lower end of the plasma-arc torch 15 is provided with an apparatus termed an arc container 21 which comprises a water jacket 22 having a pair of water inlets 24 which connect to water conduits 25. The water jacket 22 is provided with an outer layer or lining 23 composed of a sound absorbent material such as plastic or reinforced rubber applied to an outer cylindrical wall 26. The water jacket 22 also has an inner cylindrical wall 27 which fits more or less snugly about the lower end of the torch 15. The water jacket 22 includes an upwardly extending cylindrical portion 30 which snugly receives the lower end of torch 15 and includes a mounting member 31 for mounting the arc container 21 in its desired location on the lower portion of torch 15. Due to a resilient nature of the upwardly extending portion 30, mounting member 31 as shown in FIGS. 2 and 3, comprises a securing belt member which by bolt 32 threadably received through an aperture at one end of member 31 compresses portion 30 to affix water jacket 22 in the desired position on torch 15. In the lower portion of water jacket 22 a guidance member 34 is provided which in this embodiment comprises an asbestos skirt, to surround the water jacket 22. The guidance member 34 is selectively secured in a desired position relative to water jacket 22 by means of a securing belt 35 which similarly to member 31 has a bolt 36 received through an aperture at one end of belt 35 into a threadable opening in the other end of the belt whereby the belt may be tightened and thus by compression secure the asbestos skirt, guidance member 34 at its desired location on the lined outer wall 26 of water jacket 22.

In operation, the apparatus shown in FIGS. 2 and 3 has a hot effluent 18 discharged from the end of nozzle portion 16 which bears upon and removes metal from the workpiece 12 and thus creates a space 19 known in the art as a kerf. The water flows into the space between the kerf 19 and the end of the nozzle portion 16. This space is thus more or less filled with the water which travels into and through jacket 22 as illustrated diagrammatically by arrows 37. Some of the water escapes from this space underneath the guidance member 34 and more is carried through the kerf 19 entrained in the effluent 18. However, it is believed that a layer of water is built up in the space between kerf 19 and the end of nozzle portion 16 which effectively suppresses the noise of the plasma-arc torch 15 in operation in a manner similar to the method and apparatus disclosed with reference to FIG. 1. This suppression is assisted by lining 23 of sound absorbent material and the guidance member 34 at least to some extent.

Figure 4:
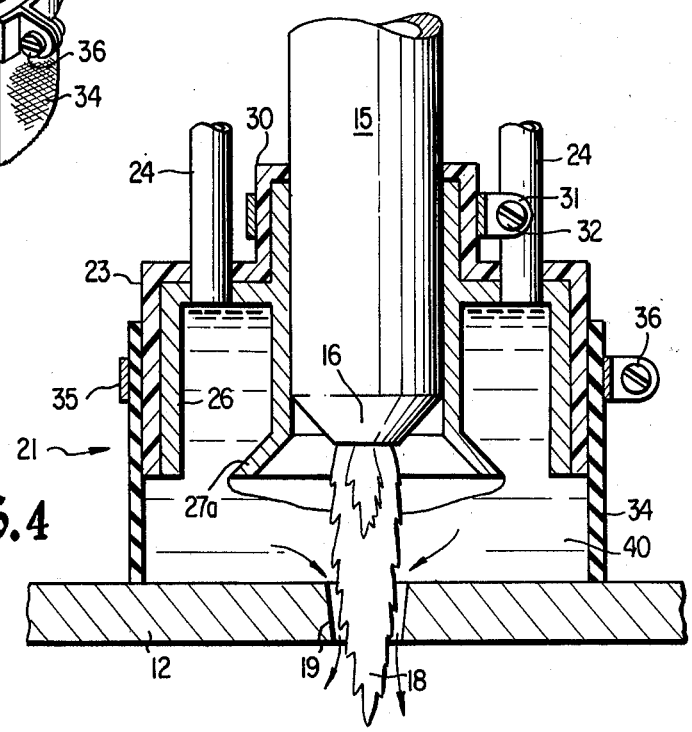
FIG. 4 is a sectional view of the modification of the invention wherein the guidance member comprises a skirt composed of rubber impregnated with lead wire and laminated with asbestos.

FIG. 4 shows a modified embodiment and also more clearly the manner in which the water is deemed to build up within the space bounded by the arc container 21. In FIG. 4, the same reference numerals are used as in FIG. S 2 and 3 except for the inner wall 27a which is flared in the bottom area as shown in FIG. 4 and the guidance member 34a comprises a cylindrical rubber skirt or sleeve which is impregnated with lead wire and laminated with asbestos rather than an asbestos skirt as disclosed in FIGS. 2 and 3. It will be noted that a substantially solid body of water 40 is provided in the space between the discharge opening of nozzle portion 16 and the opening in workpiece 12 of kerf 19.

Figure 5:
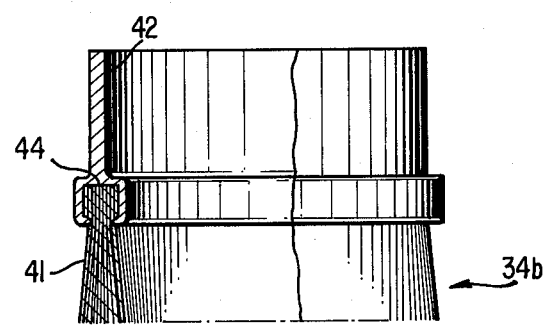
FIG. 5 shows a modified guidance member which comprises a dense brush.

FIG. 5 discloses a still further guidance member 34b which comprises a dense brush 41 extending from a rubber sleeve 42 which has a groove 44 adapted to receive and retain the upper portions of the brush 41. Brush 41 is of sufficient density to retard the passage of water therethrough and therefore create conditions which will provide a substantially solid barrier of water similar to body 40 shown in FIG. 4.

Figure 6:
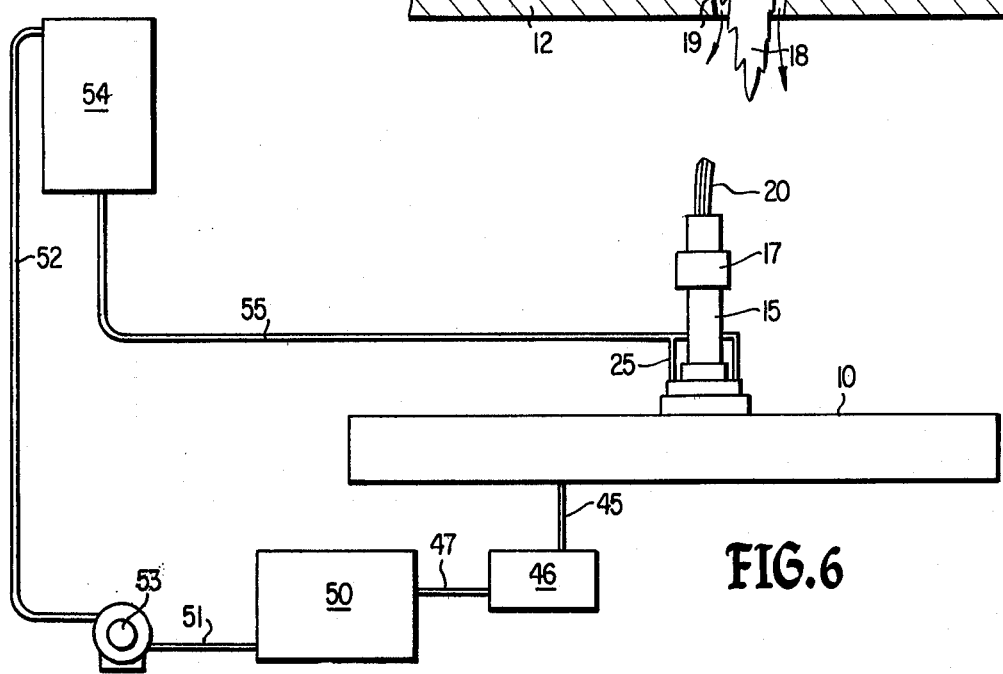
FIG. 6 is a schematic drawing illustrating a recirculation system which may be utilized with the invention.

In FIG. 6, a recirculation system is shown schematically wherein an outlet drain 45 provided for burning table 10 leads into a separator 46 adapted to remove and separate the contaminants from the water. The separator discharges water through a discharge pipe 47 into a sump tank 50 from which a water pump 53 receives a suction pipe 51 and pumps water through a discharge pipe 52 into a supply tank 54 which, in turn, provides by its location, or other suitable pressure means applied thereto, an appropriate head on a supply pipe 55 which supplies water to conduits 25. Thus, in operation, the plasma-arc torch 15 operates under the conditions as indicated for FIGS. 1–4 and water together with portions of the metal which have been cut are received at the bottom of the cutting table 10 and eventually by the outlet drain 45 wherein they are received in the separator 46. Here, the contaminants are removed and, being rich in the metals involved, can subsequently be reused in the steel making or other processes. From the separator 46, the water, less the contaminants, is received in sump tank 50 wherein further contaminants or precipitants may settle and the water therein is pumped by water pump 53 via pipes 51 and 52 to the supply tank 54 from whence it is again recirculated back to torch 15 via supply pipe 55 and conduits 25. Pump 53 may be intermittent, being actuated by the level of water in sump tank 50, and the process may be utilized at the same time torch operations are taking place or between such operations as long as there is an adequate supply of water from tank 54 or other appropriate source.

Figure 7:
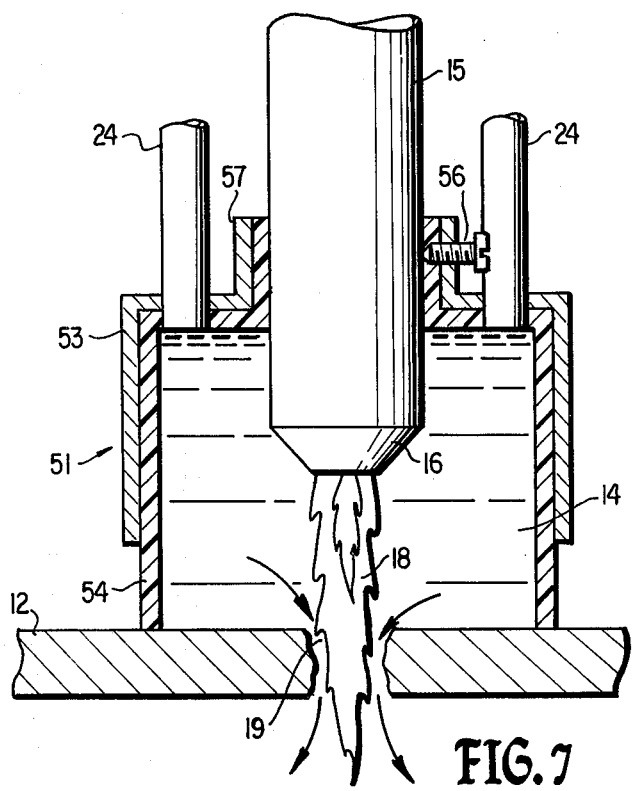
FIG. 7 is a sectional view in elevation of a further modification wherein the guidance member comprises sound absorbent material.

Referring to the embodiment of FIG. 7, it will be noted that torch 15 receives in its lower portion an arc container 51 comprised of a metallic cylindrical member 53 and a sound absorbent liner 54 which extends beyond cylindrical member 53 to form the barrier or guidance member which engages workpiece 12 as shown. Arc container 51 is connected to torch 15 by means of a set screw 56 received threadably in a neck portion 57 of arc container 51 which neck portion 57 fits snugly around torch 15. Water inlets 24 are provided into the arc container 51 whereby a solid body of water 14 is formed therein to surround the cutting flame 18. It will be understood that in operation water is continually entering the inlets 24 and being discharged through the kerf 19 and, to some extent, under the lower ends of the liner 54 where it engages workpiece 12.

Figure 9:
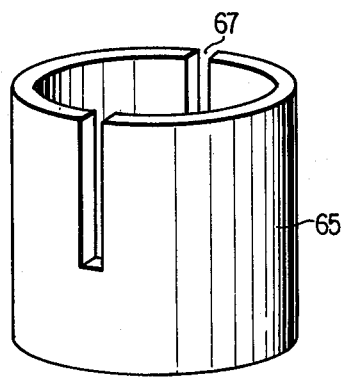
FIG. 9 is a perspective view of the cup shaped member in FIG. 8 shown separately.
Figure 8:
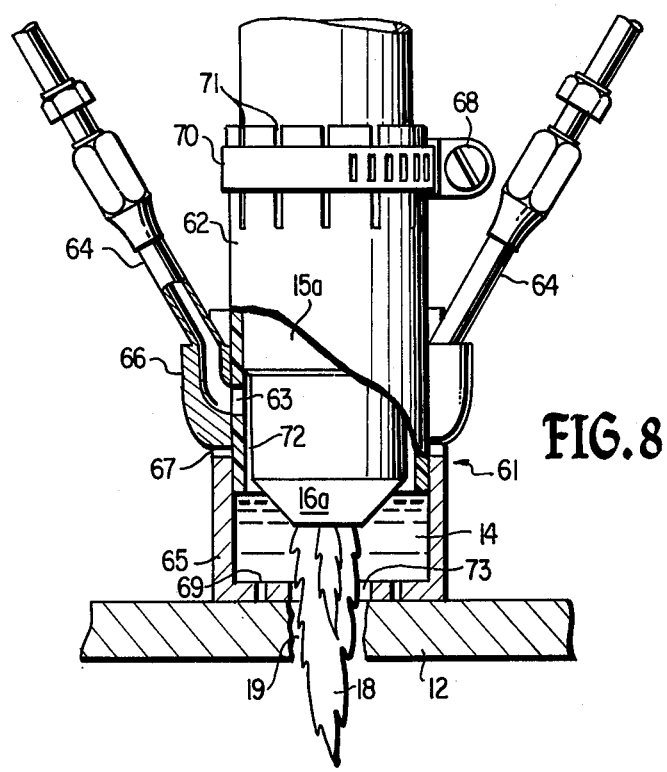
FIG. 8 is an elevational view in partial section showing a still further modification of the invention wherein the guidance member comprises a cup shaped piece slideably received in lower portion of the torch with an opening in the bottom for the plasma flame.

In the embodiment shown in FIGS. 8 and 9 a water jacket 62 has a plurality of slits 71 in its upper portion where it is secured to the plasma torch 15a by means of a belt 70 and bolt 68 which is provided for the purpose of tightening belt 70 about the upper end of water jacket 62. The lower end of water jacket 62 has welded thereto a pair of ears 66 which provide a passage from water inlets 64 through openings 63 into an annular space 72 between the lower end of jacket 62 and the lower portion of torch 15a above nozzle portion 16a. Thus, the body of water 14 is being constantly replenished from water entering annular space 72. Slideably received by the lower portion of water jacket 62 is a cup-like barrier member 65 which is provided with a pair of slots 67 to receive ears 66. Barrier member 65 is composed of a plastic such as nylon and bears a workpiece 12. Optionally, a plurality of apertures 69 may be provided in the bottom portion of barrier member 65 to provide a thin layer of water between the bottom of barrier member 65 and workpiece 12 so that the barrier member 65 slides more readily over the workpiece 12. A larger opening 73 is provided for the cutting flame 18. It will be understood that with water continuously being supplied through inlets 64 into the barrier member 65 to form the body of water 14, at the same time a like amount of water is continuously being discharged from barrier member 65 through opening 73 and kerf 19 and to some extent through apertures 69, if provided. Due to the vertically slideable nature of the barrier member 65 on jacket 62, it can be utilized on workpieces 12 with irregularities wherein it tends to ride up and down relative to water jacket 62 in response to such irregularities. The water pressure within barrier member 65 due to the body of water 14 tends to urge barrier member 65 against the workpiece 12. In operation, the flow of water through the barrier member 65 is about ten gallons per minute or less.

Having described my invention, what I claim as new and desire to claim by Letters Patent of the United States is:

1. In a process wherein metal is removed from a metal workpiece by a hot effluent discharged from a torch, the use of a solid layer of water which is provided so as to surround the space between the hot effluent discharge of said torch and said workpiece and said hot effluent being immersed in and piercing through said layer of water.

2. A process in accordance with claim 1 wherein said water layer is provided by guidance means.

3. A process in accordance with claim 2 wherein said guidance means comprises a pliant material.

4. A process in accordance with claim 3 wherein said guidance means comprises an asbestos cloth.

5. A process in accordance with claim 3 wherein said guidance means comprises a rubber skirt.

6. A process in accordance with claim 3 wherein said guidance means comprises a brush member.

7. A process in accordance with claim 2 wherein said guidance means comprises a plastic member.

8. A process in accordance with claim 1 wherein guidance means surrounds the discharge of said torch, whereby said discharge is immersed in a volume of water provided immediately about said hot effluent in the space above said workpiece.

9. A process in accordance with claim 1 wherein said hot effluent cuts through said workpiece and a further layer of water is provided under said workpiece.

10. A process in accordance with claim 9 wherein the water provided for said water layer and the further layer under said workpiece is recirculated and contaminants received in the water from the cutting operation are removed therefrom.

11. A process in accordance with claim 1 wherein said torch comprises a plasma-arc torch.

12. In a process of removing metal from a metal workpiece by means of a plastic-arc torch, the immersion of said workpiece and the plasma-discharge portion of said torch under a layer of water whereby the effluent discharged from said portion pierces through said layer of water and the fumes, noise and light emissions generated by the plasma-arc cutting operation are substantially reduced.

13. A process in accordance with claim 12 wherein said layer of water is contained within a guidance means introduced to surround the discharge portion of said torch.

14. A process in accordance with claim 13 wherein water is provided under said workpiece and said water together with the water layer provided within said guidance means is recirculated and contaminants received in the water from the cutting operation are removed therefrom.

15. A process in accordance with claim 13 wherein said guidance means comprises a pliant material.

16. A process in accordance with claim 15 wherein said pliant material comprises asbestos cloth.

17. A process in accordance with claim 15 wherein said guidance means comprises a rubber skirt.

18. A process in accordance with claim 15 wherein said guidance means comprises a brush member.

19. A process in accordance with claim 13 wherein said guidance means comprises a cup-shaped member with an opening in its bottom to receive said discharge portion of said torch.

20. In a plasma-arc cutting torch of the type having an elongated body with a nozzle at an end thereof from which a high velocity plasma jet is projected to cut an underlying workpiece, a method of reducing the noise generated by the torch which comprises the providing of a volume of water between said workpiece and said nozzle whereby said water volume contacts said workpiece with said nozzle being immersed in said water volume, and piercing through said water volume by said plasma jet to cut said workpiece.

21. The method of claim 20 including the confining of said water volume to the immediate vicinity of said nozzle and the area of said workpiece being cut.

22. The method of claim 21 including the continuous introduction of replenishment water to said water volume.

23. The method of claim 22 including the continuous recirculation of water in said water volume.

* * * * *